United States Patent Office 2,728,781
Patented Dec. 27, 1955

2,728,781

ACYLOXY SUBSTITUTED-GLYCIDYL POLY-ETHERS OF DIHYDRIC PHENOLS

Edward C. Shokal, Walnut Creek, and Clayton A. May, Oakland, Calif., assignors to Shell Development Company, Emeryville, Calif., a corporation of Delaware No Drawing. Application March 29, 1952,
Serial No. 279,462

11 Claims. (Cl. 260—348)

This invention relates to a process for producing epoxy esters and to a class of novel epoxy esters having very useful properties.

Materials known as glycidyl polyethers of dihydric phenols are prepared by reacting a dihydric phenol with epichlorhydrin or glycerol dichlorhydrin while having present sufficient alkali to combine with the released hydrogen chloride. The product is normally a mixture of compounds which have alternating glyceryl radicals and aromatic hydrocarbon radicals (from the dihydric phenol) linked together in a chain by ether oxygen atoms. The interior glyceryl radicals have a hydroxyl group joined thereto and the terminal radicals of the chain are predominantly glycidyl radicals, although a small proportion is 2,3-dihydroxypropyl and 3-chloro-2-hydroxypropyl radicals.

It has been desired to obtain from glycidyl polyether of a dihydric phenol, a product having the alcoholic hydroxyl groups therein esterified with a monocarboxylic acid such as acetic acid while still having the epoxy groups of the glycidyl radicals substantially unchanged and unesterified. If the glycidyl polyether is reacted with a monocarboxylic acid, the hydroxyl groups can be esterified, but the epoxy groups are also esterified and the product contains no unchanged glycidyl radicals.

We have now discovered that monocarboxylic acid esters of glycidyl polyethers of a dihydric phenol having the glycidyl radicals substantially unaltered can be prepared by heating and reacting glycidyl polyether of a dihydric phenol, which polyether contains alcoholic hydroxyl groups, with a monocarboxylic acid anhydride while distilling the liberated monocarboxylic acid from the reaction mixture substantially as fast as formed. In view of the reactivity of the epoxy group with acid-acting substances, it was unexpected to find that the epoxy groups of the glycidyl polyether could co-exist in the heated reaction mixture with the acid anhydride without reaction therebetween occurring and that even though the liberated free monocarboxylic acid was present in the reaction mixture at least momentarily, no appreciable reaction with the epoxy groups occurred.

Epoxy esters of a variety of monocarboxylic acids containing at least two carbon atoms can be produced by the process of the invention. The esters correspond to the acid anhydride employed as reactant in the process. For example, the epoxy-containing acetate ester is obtained with use of acetic acid anhydride as reactant. Although it is preferred to employ an acid anhydride of a saturated fatty acid of 2 to 4 carbon atoms such as acetic acid anhydride, propionic acid anhydride, butyric acid anhydride or isobutyric acid anhydride, acid anhydrides of other monocarboxylic acids having at least two carbon atoms can also be used as is the case, for example, with caproic acid anhydride, caprylic acid anhydride, crotonic acid anhydride, acrylic acid anhydride, methacrylic acid anhydride, propiolic acid anhydride, and benzoic acid anhydride, as well as mixed acid anhydrides such as acetic-lauric acid anhydride, acetic-oleic acid anhydride, and acetic-linolenic acid anhydride.

The glycidyl polyether of a dihydric phenol containing alcoholic hydroxyl groups which is converted to the epoxy ester is usually prepared by heating and reacting a dihydric phenol with epichlorhydrin at about 50° C. to 150° C. using 1 to 2 or more mols of epichlorhydrin per mol of dihydric phenol. Also present is a base, such as sodium or potassium hydroxide, in amount at least sufficient to combine with the liberated hydrogen chloride. The heating is continued for several hours to effect the reaction and the product is then washed with hot water until free of salt and base. The product, instead of being a single simple compound, is generally a complex mixture of compounds of the formula

R'—(O—R—O—CH₂—CHOH—CH₂)ₙ—O—R—O—R'' wherein $n$ is a value of 0 to 15, R is the hydrocarbon radical of the dihydric phenol (the divalent hydrocarbon radical which was linked to the two phenolic hydroxyl groups of the dihydric phenol employed as reactant), and R' and R'' are members of the class consisting of glycidyl, 2,3-dihydroxypropyl, and 3-chloro-2-hydroxypropyl radicals with glycidyl radicals constituting a majority, usually of at least 80% of the R' and R'' groups. The 2,3-dihydroxypropyl radicals appear to be present from hydration of glycidyl radicals and the 3-chloro-2-hydroxypropyl radicals probably result from incomplete dehydrochlorination. Besides esterifying the hydroxyl groups of the internal 2-hydroxyglyceryl or 2-hydroxytrimethylene radicals, the process enables esterification of the hydroxyl groups contained in the 2,3-dihydroxypropyl and 3-chloro-2-hydroxypropyl terminal radicals.

The glycidyl polyether can be of any dihydric phenol including mononuclear phenols such as resorcinol, catechol, hydroquinone, methyl resorcinol, etc.; or polynuclear phenols such as 2,2-bis(4-hydroxyphenyl)propane, 4,4'-dihydroxybenzophenone, 4,4'-dihydroxydiphenyl, bis(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy-2-tertiary butylphenyl)propane, 2,2-bis(2-hydroxynaphthyl)pentane, 1,5-dihydroxynaphthalene, etc. Preferred polyethers for use in the invention are prepared from 2,2-bis(4-hydroxyphenyl)propane. They contain terminal glyceryl radicals with a chain of alternating glyceryl and 2,2-bis(4-hydroxyphenylene)propane radicals joined with intervening ethereal oxygen atoms.

The process of the invention is executed by bringing together the glycidyl polyether and the acid anhydride while heating in order to boil the reaction mixture and remove the liberated monocarboxylic acid anhydride as distillate substantially as fast as formed. By having the reaction mixture anhydrous during the course of the reaction, the formation and presence of free monocarboxylic acid therein is avoided. Normally, the quantities of reactants are such that a considerable excess of the acid anhydride is used over the stoichiometric amount needed to esterify all the alcoholic hydroxyl groups of the glycidyl polyether. Although the two reactants can be brought together by adding the acid anhydride to the whole quantity of the polyether, it is more desirable to effect the process in the reverse order of addition and thereby ensure that excess acid anhydride is present in even local regions of the reaction mixture.

The desired esterification reaction is quite rapid in the boiling reaction mixture. The liberated monocarboxylic acid can be removed from the boiling reaction mixture as sole distillate under usual atmospheric pressure with the reaction being effected at about atmospheric pressure.

The temperature employed for the reaction is governed largely by the distilling temperature used to remove the free acid and is generally about 70° C. to 200° C. Since the free acids, especially with higher members, have rather high boiling points, the process may be effected with the reaction mixture under subatmospheric pressure. Another means of reducing the operating temperature of the reaction mixture is to effect the reaction in the presence of an agent which forms an azeotrope with the liberated monocarboxylic acid. While various organic compounds are suitable for this purpose, it is preferred to employ normally liquid aromatic hydrocarbons or halogented derivatives thereof such as, for example, benzene, toluene, xylene, ethylbenzene, monochlorobenzene, dichlorobenzene, etc. The use of such azeotroping agents has an additional advantage since they are convenient for dehydrating the glycidyl polyether and for freeing the acid anhydride of acid. Thus by mixing the reactants separately with the azeotroping agent and subjecting the two mixtures to distillation for removal of water and free acid, the reactants are prepared for effecting the process of the invention under best conditions.

Upon completion of the reaction, the unreacted acid anhydride and azeotroping agent, if any, are distilled from the product. This distillation is preferably effected with at least the last part thereof under vacuum. If desired, the boiling mass of product can be sparged with an inert gas such as nitrogen or methane in order to insure removal of all residual acid anhydride from the product.

The invention will be better understood by considering the following examples. Preparation and properties of a typical glycidyl polyether reactant, termed Polyether A herein for convenience, is described first. The parts are by weight.

POLYETHER A

A solution consisting of 117 parts of water, 12.2 parts of sodium hydroxide and 133.8 parts of 2,2-bis(4-hydroxyphenyl)propane is prepared by heating the mixture of ingredients to 170° C. in a closed reactor fitted with a stirrer, and then cooling to about 46° C., at which temperature 140.6 parts of epichlorhydrin are added while agitating the mixture. After 25 minutes have elapsed, there is added during an additional 15 minutes' time a solution consisting of 56.2 parts of sodium hydroxide in 117 parts of water. This causes the temperature to rise to 63° C. and stirring is continued at about 70° C. for 30 minutes. The stirred reaction mixture is washed with water for about 4.5 hours. The product is dried by heating to a final temperature of 140° C. in 80 minutes, and cooled rapidly. The resulting glycidyl polyether is a very viscous liquid at room temperature which has a Durrans' Mercury Method softening point of 27° C. and the following analysis.

Hydroxyl value, gram equiv./100 grams _____ 0.142
Epoxide value, gram equiv./100 grams _____ 0.405
Chlorine, per cent _____ 0.61
Water, per cent _____ 0.34
Molecular weight _____ 460

The foregoing analysis indicates that the polyether has a value of $n=0.41$ in the previously described structural formula with about 92% of the terminal glyceryl radicals existing as glycidyl groups, 4.1% as 2,3-dihydroxypropyl groups and 3.9% as 3-chloro-2-hydroxypropyl groups.

*Example 1*

The epoxy acetate of Polyether A was prepared. A solution of 300 parts of Polyether A dissolved in 551 parts of benzene was heated in a vessel fitted with a packed distillation column and subjected to distillation with removal of about 70 parts of distillate. The solution was then cooled to about 35° C., and 691 parts of freshly distilled acetic anhydride added. The reaction mixture was boiled and about 539 parts of distillate were collected during 3 hours' time containing liberated acetic acid in azeotropic mixture with benzene. The contents of the vessel were quickly cooled and then subjected to stripping under a Claisen head with increasing temperature and decreasing pressure in order to remove the benzene and acetic acid anhydride. Stripping was completed at 154° C. and 0.2 mm. Hg. The esterified product was a very viscous material of consistency similar to the starting polyether. The product in amount of 315 parts of an expected 317 parts analyzed as follows.

|  | Found | Theory |
| --- | --- | --- |
| Ester value, eq./100 g | 0.144 | 0.134 |
| Hydroxyl value, eq./100 g | 0.013 | 0.000 |
| Epoxy value, eq./100 g | 0.372 | 0.383 |

The foregoing indicates that esterification of the alcoholic hydroxyl groups was about 92% complete and that about 95% of the epoxy groups were unchanged.

*Example 2*

A solution of 1000 parts of Polyether A in 200 parts of toluene was dehydrated by azeotropic distillation removing 58 parts of distillate. A solution of 1500 parts of acetic anhydride in 1000 parts of toluene was placed in a vessel equipped with a distillation column and a dropping funnel, and subjected to distillation with removal of about 160 parts of distillate whereupon the dehydrated solution of Polyether A was added during the course of about an hour with removal of about 410 parts of distillate containing liberated acetic acid in azeotropic mixture with toluene. Boiling and distillation were continued for about 2.25 hours more with recovery of about 600 parts of distillate. The reaction mixture was then subjected to stripping under a Claisen head with nitrogen sparge to a final temperature of 157° C. and pressure of 0.4 mm. Hg. The viscous product in amount of 1055 parts of an expected 1059 parts analyzed as follows.

|  | Found | Theory |
| --- | --- | --- |
| Ester value, eq./100 g | 0.145 | 0.134 |
| Hydroxyl value, eq./100 g | 0.003 | 0.000 |
| Epoxy value, eq./100 g | 0.377 | 0.383 |

The analysis indicates that esterification of alcoholic hydroxyl groups was about 98% complete and that about 98.5% of the epoxy groups survived the esterification without reacting.

*Example 3*

The epoxy propionate of Polyether A was prepared. A solution of 300 parts of Polyether A in 150 parts of monochlorobenzene was subjected to dehydration by azeotropic distillation. A mixture of 500 parts of monochlorobenzene and 570 parts of propionic anhydride in an apparatus as described in Example 2 was subjected to distillation with recovery of about 20 parts of distillate whereupon the solution of dehydrated Polyether A was added to the boiling mixture in about 30 minutes' time, some 120 parts of distillate being recovered during this period containing liberated propionic acid in azeotropic mixture with toluene. The boiling of the reaction mixture was continued for about an additional 2 hours' time while recovering about 280 parts of distillate after which the reaction mixture was subjected to stripping under a Claisen head while sparging with nitrogen to a temperature of 154° C. at a pressure of less than 0.1 mm. Hg. The resulting viscous product was obtained in theoretical yield and analyzed as follows.

|  | Found | Theory |
| --- | --- | --- |
| Ester value, eq./100 g | 0.165 | 0.131 |
| Hydroxyl value, eq./100 g | <0.001 | 0.000 |
| Epoxy value, eq./100 g | 0.358 | 0.375 |

The foregoing analysis shows that the desired esterification was complete and that about 96% of the epoxy groups survived unchanged.

The products obtained by the process of the invention are very useful substances. This is especially true of the epoxy esters obtained from a monocarboxylic acid anhydride of a saturated fatty acid of 2 to 4 carbon atoms. Such a product is an epoxy ester of a mixture of polyethers of the formula

wherein $n$ is a value of 0 to 15, R is the hydrocarbon radical linked directly to the two hydroxyl groups of a dihydric phenol, and R' and R" are members of the class consisting of glycidyl, 2,3-dihydroxypropyl, and 3-chloro-2-hydroxypropyl radicals with glycidyl radicals constituting a majority of the R' and R" groups, said ester having at least 90% of the glycidyl radicals of the above-described polyethers intact as glycidyl radicals and having at least 90% of the alcoholic hydroxyl groups replaced with acyloxy groups of a saturated fatty acid of 2 to 4 carbon atoms. The terminal R' and R" groups may thus be a small proportion of unesterified 2,3-dihydroxyproyl and 3-chloro-2-hydroxypropyl radicals with the largest part being 3-acyloxy-2-hydroxypropyl, 2-acyloxy-3-hydroxypropyl, 2,3-diacyloxypropyl, and 2-acyloxy-3-chloropropyl radicals. The completely esterified polyether is devoid of radicals containing hydroxyl groups. Preferred products are the esters of a saturated fatty acid of 2 to 4 carbon atoms of polyethers wherein R is a 2,2-bis(4-phenylene)propane radical and $n$ is from 0.1 to 4, particularly from 0.1 to 0.6, these particular esters being viscous liquids or semi-solids at normal temperature of 20° C. and thereby different from the solid esters of polyethers with $n$ greater than 0.6. These particular liquid esters are of polyethers wherein about 80% to 95% of the R' and R" groups are glycidyl radicals.

The acetate, propionate and butyrate esters are valuable because they possess the unexpected property of being homogeneously compatible with vinyl resins in large proportion, a property not possessed by the parent glycidyl polyethers. These esters are useful as stabilizers with polymer or copolymer of vinyl halides, and the normally liquid ester can be used with such vinyl polymers as both plasticizer and stabilizer, the stabilizing effect being realized owing to the presence of the glycidyl radicals therein.

The unexpected compatibility in large proportion was found with polyvinyl acetate (Vinylite AYAA) and a copolymer of about 95% vinyl chloride with 5% vinyl acetate (Vinylite VYHH). Solutions were prepared containing 50% by weight of Polyether A in methyl ethyl ketone and 50% by weight of the acetate ester described in Example 1 in methyl ethyl ketone. Using a mixture of equal weights of methyl ethyl ketone and toluene as solvent, 20% solutions of the polyvinyl acetate and the vinyl chloride-vinyl acetate copolymer were prepared. Mixed solutions were then prepared with the weight ratio and kind of non-volatile ingredients as indicated in the table below. The mixed solutions were spread on glass panels with the aid of a doctor blade, the solvent allowed to evaporate, and the films baked for about one hour at 100° C. Compatibility was determined by observing whether the films were clear or cloudy. The results are tabulated below.

|  | Weight ratio of Polyether Component to Vinyl Resin | Polyvinyl Acetate | Copolymer of Vinyl Chloride-Vinyl Acetate |
| --- | --- | --- | --- |
| Polyether A | 4:1 | IC | IC |
| Do | 1:1 | IC | IC |
| Acetate of Polyether A | 4:1 | C | C |
| Do | 1:1 | C | C |

Key: C=compatible; IC=incompatible.

More generally, the products of the process are useful in the manufacture of surface coating, adhesive, potting and molding compositions. Upon addition to the epoxy ester of about 5 to 10% of an amine, the mixture cures when heated to a hard tough resin.

We claim as our invention:

1. A process for the production of an epoxy ester which comprises heating and reacting an anhydride of a hydrocarbon monocarboxylic acid of 2 to 18 carbon atoms with glycidyl polyether of a dihydric phenol, which polyether contains alcoholic hydroxyl groups, under anhydrous conditions while distilling the liberated monocarboxylic acid from the reaction mixture substantially as fast as formed whereby esterification of the alcoholic hydroxyl groups in the polyether occurs without appreciable destruction of the epoxide groups therein.

2. A process for the production of an epoxy ester which comprises heating and reacting under anhydrous conditions an anhydride of a hydrocarbon monocarboxylic acid of 2 to 18 carbon atoms with a mixture of polyethers of the formula

wherein $n$ is a value of 0 to 15, R is the hydrocarbon radical of a dihydric phenol having not more than two condensed rings, and R' and R" are members of the class consisting of glycidyl, 2,3-dihydroxypropyl, and 3-chloro-2-hydroxypropyl radicals with glycidyl radicals constituting a majority of the R' and R" groups, said reaction being effected while distilling the liberated monocarboxylic acid from the reaction mixture substantially as fast as formed.

3. A process for the production of an epoxy ester which comprises heating and reacting under anhydrous conditions the anhydride of a saturated fatty acid of 2 to 4 carbon atoms with a mixture of polyethers of the formula

wherein $n$ is a value of 0 to 15, R is the hydrocarbon radical of a dihydric phenol having not more than two condensed rings, and R' and R" are members of the class consisting of glycidyl, 2,3-dihydroxypropyl, and 3-chloro-2-hydroxypropyl radicals with glycidyl radicals constituting a majority of the R' and R" groups, said reaction being effected while distilling the liberated fatty acid from the reaction mixture substantially as fast as formed.

4. A process as defined in claim 3 wherein the saturated fatty acid is acetic acid.

5. A process as defined in claim 3 wherein the saturated fatty acid is acetic acid and the reaction is effected under about atmospheric pressure with the liberated acetic acid being removed from the reaction substantially as fast as formed as the azeotrope with benzene.

6. A process as defined in claim 3 wherein the saturated fatty acid is acetic acid and the reaction is effected under about atmospheric pressure with the liberated acetic acid being removed from the reaction substantially as fast as formed as the azeotrope with toluene.

7. A process as defined in claim 3 wherein the saturated fatty acid is propionic acid.

8. An epoxy ester of a mixture of polyethers of the formula

wherein $n$ is a value of 0 to 15, R is the hydrocarbon radical of a dihydric phenol having not more than two condensed rings, and R' and R" are members of the class consisting of glycidyl, 2,3-dihydroxypropyl, and 3-chloro-2-hydroxypropyl radicals with glycidyl radicals constituting a majority of the R' and R" groups, said ester having at least 90% of the glycidyl radicals of the above-described polyethers intact as glycidyl radicals and having at least 90% of the alcoholic hydroxyl groups replaced with acyloxy groups of a fatty acid of 2 to 4 carbon atoms.

9. A liquid epoxy ester as defined in claim 8 wherein the saturated fatty acid is acetic acid.

10. A liquid epoxy ester as defined in claim 8 wherein the saturated fatty acid is propionic acid.

11. A liquid epoxy ester as defined in claim 8 wherein the saturated fatty acid is butyric acid.

References Cited in the file of this patent

UNITED STATES PATENTS

| | | |
|---|---|---|
| 2,502,145 | Greenlee | May 28, 1950 |
| 2,504,518 | Greenlee | Apr. 18, 1950 |
| 2,506,486 | Bender and Farnham | May 2, 1950 |
| 2,575,440 | Bradley | Nov. 20, 1951 |
| 2,581,464 | Zech | Jan. 8, 1952 |
| 2,592,560 | Greenlee | Apr. 15, 1952 |
| 2,602,075 | Carpenter | July 1, 1952 |
| 2,615,007 | Greenlee | Oct. 21, 1952 |
| 2,698,308 | Grecelius | Dec. 28, 1954 |

OTHER REFERENCES

Chemical Review, vol. 45, p. 25 (1949).